(12) United States Patent  
Alonte et al.

(10) Patent No.: US 9,714,582 B2  
(45) Date of Patent: Jul. 25, 2017

(54) THERMOCOUPLE WITH A VORTEX REDUCING PROBE

(71) Applicant: SOLAR TURBINES INCORPORATED, San Diego, CA (US)

(72) Inventors: Rodolfo G. Alonte, Ramona, CA (US); Bruno Enriquez Struck, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 448 days.

(21) Appl. No.: 14/286,754

(22) Filed: May 23, 2014

(65) Prior Publication Data

US 2015/0337678 A1    Nov. 26, 2015

(51) Int. Cl.
| | | |
|---|---|---|
| *F01D 21/00* | (2006.01) | |
| *G01K 7/02* | (2006.01) | |
| *G01M 15/14* | (2006.01) | |
| *F01D 17/08* | (2006.01) | |
| *G01K 13/02* | (2006.01) | |
| *G01K 1/08* | (2006.01) | |

(52) U.S. Cl.
CPC ......... *F01D 21/003* (2013.01); *F01D 17/085* (2013.01); *G01K 1/08* (2013.01); *G01K 7/023* (2013.01); *G01K 13/02* (2013.01); *G01M 15/14* (2013.01); *F05D 2250/14* (2013.01); *F05D 2250/231* (2013.01); *F05D 2250/232* (2013.01); *F05D 2250/241* (2013.01); *G01K 2013/024* (2013.01)

(58) Field of Classification Search
CPC ....... F01D 21/003; F01D 17/085; G01K 1/12; G01K 7/02; G01K 1/20; G01K 7/06; F05D 2260/80; F05D 2260/83; F05D 2270/301; F05D 2270/303; F05D 2270/313
See application file for complete search history.

(56) References Cited

U.S. PATENT DOCUMENTS

| | | | | | |
|---|---|---|---|---|---|
| 3,653,976 | A | * | 4/1972 | Miller | ................... F01D 17/085 136/231 |
| 5,185,996 | A | * | 2/1993 | Smith | ................... F01D 17/085 374/144 |
| 5,364,186 | A | * | 11/1994 | Wang | ........................ G01J 5/04 374/126 |

(Continued)

FOREIGN PATENT DOCUMENTS

GB    2226366 A  *  6/1990  ........... F01D 17/085

*Primary Examiner* — Kenneth Bomberg  
*Assistant Examiner* — Hoon Choi  
(74) *Attorney, Agent, or Firm* — Procopio, Cory, Hargreaves & Savitch, LLP (57) ABSTRACT

A sensor assembly for a gas turbine engine is disclosed. The sensor assembly includes a bushing and a probe. The probe includes a body, an anti-vortex tip, and a tip end. The body extends from the bushing and includes a body surface. The body surface is a right circular cylinder with a first diameter. The anti-vortex tip extends from the body and includes an anti-vortex tip surface. The anti-vortex tip surface is a conical surface extending from the body surface to a second diameter at a taper angle from fourteen degrees to sixteen degrees. The tip end extends with a spherical shape from the anti-vortex tip.

18 Claims, 4 Drawing Sheets

(56) References Cited

U.S. PATENT DOCUMENTS

| | | | |
|---|---|---|---|
| 7,153,023 B2 * | 12/2006 | Howard | G01K 13/02 277/606 |
| 2004/0114664 A1 * | 6/2004 | Park | G01K 7/02 374/179 |
| 2010/0074572 A1 * | 3/2010 | Zheng | F01D 17/02 385/13 |
| 2014/0186168 A1 * | 7/2014 | Chuong | F01D 9/065 415/182.1 |
| 2014/0376593 A1 * | 12/2014 | Ewing | G01K 7/02 374/179 |

* cited by examiner

THERMOCOUPLE WITH A VORTEX REDUCING PROBE

TECHNICAL FIELD

The present disclosure generally pertains to gas turbine engines, and is directed toward a thermocouple for a gas turbine engine, the thermocouple including a vortex reducing probe.

BACKGROUND

Gas turbine engines include compressor, combustor, and turbine sections. During operation of a gas turbine engine it may be desirable to measure various temperatures within the gas turbine engine including the air temperature at the inlet to the compressor, one or more temperatures within the turbine section, such as the temperature of the combusted gas between the second and third stages of the turbine section, and the exhaust gas temperature.

Thermocouple probes when used within the gas turbine engine may be damaged by the conditions within the gas turbine engine, conditions such as the temperature, pressure, and velocity of the gas. The interaction between the probe and the gas may generate vortexes and may otherwise induce vibrations within the probe. The vibrations combined with other factors may damage the probe and reduce the service life of the probe.

The present disclosure is directed toward overcoming one or more of the problems discovered by the inventors.

SUMMARY OF THE DISCLOSURE

A sensor assembly for a gas turbine engine is disclosed. In embodiments, the sensor assembly includes a flange, a bushing, tubing, and a probe. The bushing is spaced apart from the flange. The bushing includes a sealing end. The tubing is located between the flange and the bushing. The probe includes a body, an anti-vortex tip, and a tip end. The body extends from the sealing end. The body includes a body surface. The body surface is a right circular cylinder with a first diameter. The anti-vortex tip extends from the body. The anti-vortex tip includes an anti-vortex tip surface. The anti-vortex tip surface is a conical surface extending from the body surface to a second diameter at a taper angle from fourteen degrees to sixteen degrees. The tip end extends from the anti-vortex tip distal to the body. The tip end includes a spherical shape.

DETAILED DESCRIPTION

The systems disclosed herein include a thermocouple sensor assembly. In embodiments, the thermocouple sensor assembly includes one or more sensor assemblies with a probe extending from a bushing into a gas turbine engine flow path. The probe includes a body with an anti-vortex tip extending from the body and a rounded tip end extending from the anti-vortex tip. The Anti-vortex tip includes a conical shape with a taper angle. The shape of the probe including the anti-vortex tip may, inter alia, reduce the formation of vortices formed by a gas within the flow path that impinges the probe and may reduce vibrations within the probe. The reduced vibrations may lead to reduced stresses within the probe, which may increase the service life of the probe and may prevent failure of the probe.

Figure 1:
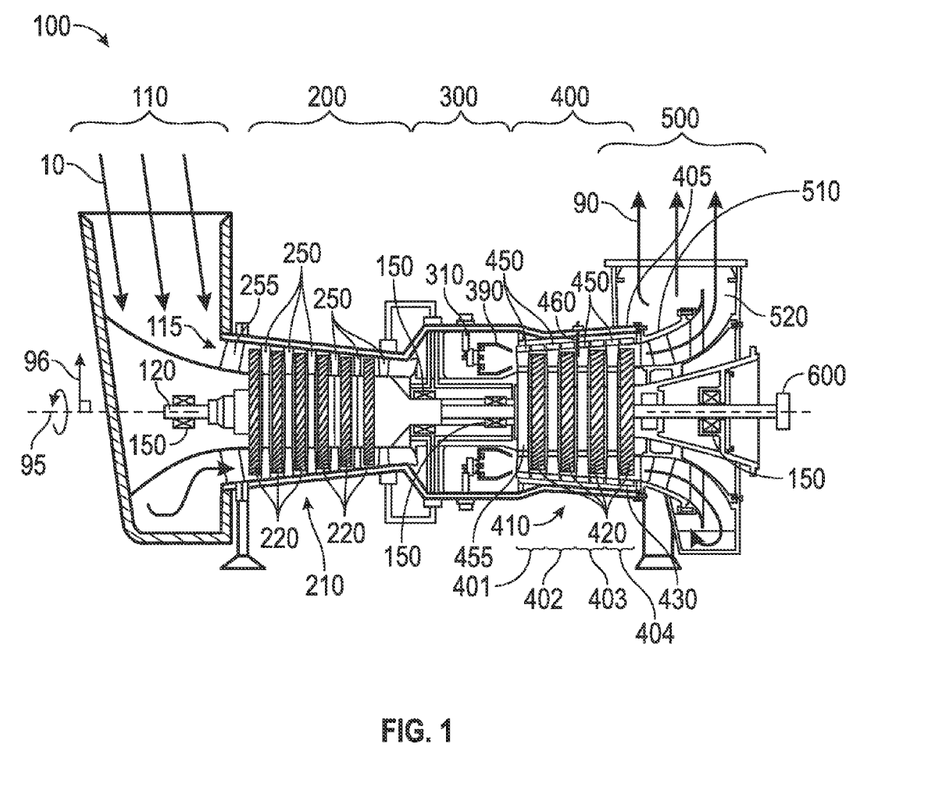
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more injectors 310 and includes one or more combustion chambers 390.

The turbine 400 may include an outer housing 405, one or more turbine housings 430, turbine rotor assembly 410, turbine nozzles 450, and turbine diaphragms 455. The outer housing 405 may be configured to contain the rotary and stationary components of the turbine 400. The one or more turbine housings 430 may be a solid of revolution with a hollow interior. The turbine housing(s) 430 may be configured to connect to outer housing 405 and may be configured to support stationary turbine components, such as the turbine nozzles 450. The turbine rotor assembly 410 mechanically couples to the shaft 120 and is located within the turbine housing 430. As illustrated, the turbine rotor assembly 410 is an axial flow rotor assembly. The turbine rotor assembly 410 includes one or more turbine disk assemblies 420. Each turbine disk assembly 420 includes a turbine disk 422 (shown in FIG. 2) that is circumferentially populated with turbine blades 425 (shown in FIG. 2).

A turbine nozzle 450 axially precedes each of the turbine disk assemblies 420. Each turbine disk assembly 420 paired with the adjacent turbine nozzle 450 that precedes the turbine disk assembly 420 is considered a turbine stage. Turbine 400 includes multiple turbine stages. In the embodiment illustrated, turbine 400 includes a first turbine stage 401, a second turbine stage 402, a third turbine stage 403, and a fourth turbine stage 404.

Each turbine nozzle 450 may be formed by a plurality of turbine nozzle segments 451 (shown in FIG. 2) supported by other stationary components, such as a turbine housing 430 and a turbine diaphragm 455. A turbine diaphragm 455 may be located radially inward from a turbine nozzle 450. Each turbine nozzle segment 451 (shown in FIG. 2) of the turbine nozzle 450 may be joined, such as by bolting, to a turbine diaphragm 455 and may couple to turbine housing 430.

The exhaust 500 includes an exhaust diffuser 510 and an exhaust collector 520.

The gas turbine engine 100 may also include one or more thermocouple sensor assemblies 460. In the embodiment illustrated, gas turbine engine 100 includes a thermocouple sensor assembly 460 with one or more probes 470 extending radially into the turbine 400 between the second turbine stage 402 and the third turbine stage 403.

Figure 2:
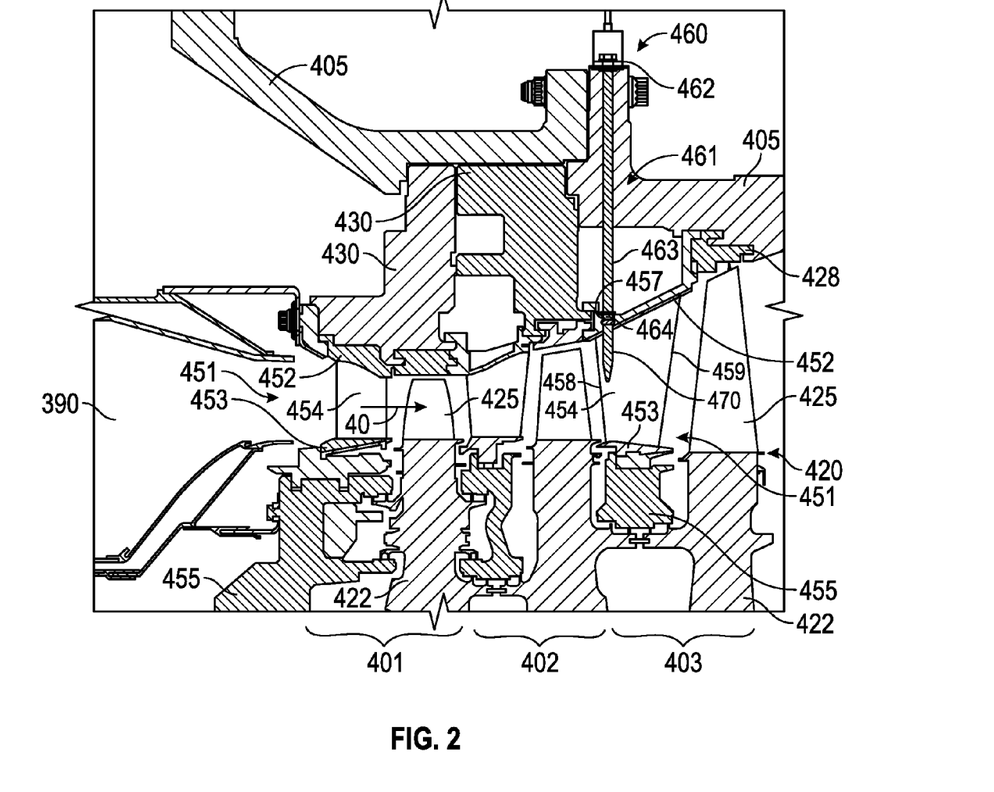
FIG. 2 is a cross-sectional view of a portion of the turbine of the gas turbine engine of FIG. 1.

FIG. 2 is a cross-sectional view of a portion of the turbine 400 of the gas turbine engine 100 of FIG. 1. As illustrated, each turbine nozzle segment 451 includes an outer shroud 452, an inner shroud 453 and one or more airfoils 454. Outer shroud 452 and inner shroud 453 may each include a portion or a sector of an annular shape, such as a sector of a toroid or a sector of a hollow cylinder. The inner shroud 453 may be located radially inward from the outer shroud 452. The airfoil(s) 454 may extend radially between the outer shroud 452 and the inner shroud 453.

Each turbine nozzle segment 451 may include an upstream end 458 and a downstream end 459. The upstream end 458 may be closest to the combustion chamber 390 and may be adjacent the turbine disk assembly 420 of the previous stage. The downstream end 459 may be the end farthest from the combustion chamber 390 and may be adjacent the turbine disk assembly 420 within the same stage as the turbine nozzle 450 that the turbine nozzle segment 451 is part of. Some of the turbine nozzle segments 451 may include a probe hole 457 extending radially through the outer shroud 452. In the embodiment illustrated, the turbine nozzle segment 451 in the third stage 403 includes a probe hole 457 extending through the outer shroud 452 proximal the upstream end 458 and circumferentially adjacent an airfoil 454. Probe hole 457 may be located between two airfoils 454 or otherwise circumferentially offset from the one or more airfoils 454 of the turbine nozzle segment 451.

Each turbine disk assembly 420 may include a turbine disk 422 and a plurality of turbine blades 425. A rotor shroud including rotor shroud segments 428 may be located adjacent and radially outward from each turbine disk assembly 420. Rotor shroud segments 428 may each include a portion or a sector of an annular shape, such as a sector of a toroid or a sector of a hollow cylinder. Rotor shroud segments 428 may be circumferentially aligned to form the rotor shroud. Rotor shroud segments 428 may be joined or otherwise coupled a turbine housing 430 or to outer housing 405.

The turbine nozzles 450 including the turbine nozzle segments 451, the turbine blades 425 and the rotor shrouds including the rotor shroud segments 428 form a turbine flow path 40. Turbine flow path 40 may be an annularly shaped path extending from the combustion chamber 390, through the turbine 400 to the exhaust diffuser 510 (shown in FIG. 1).

Thermocouple sensor assembly 460 may include one or more sensor assemblies 461. Sensor assembly 461 may include a flange 462, tubing 463, a bushing 464, and a probe 470. The flange 462 may be coupled to a stationary component of the gas turbine engine 100, such as the outer housing 405. The tubing 463 may be located between the flange 462 and the bushing 464. In embodiments, tubing 463 may extend into flange 462 and/or into bushing 464. Tubing 463 may extend inward from the flange 462 and may extend through the stationary components, such as outer housing 405 and turbine housing(s) 430. In the embodiment illustrated in FIG. 2, tubing 463 extends through outer housing 405 and through a space between outer housing 405.

Bushing 464 is spaced apart from flange 462. Bushing 464 may be at least partially inserted into a probe hole 457. Bushing 464 may be configured to form a seal with outer shroud 452 to prevent any of the combusted air/fuel mixture traveling along turbine flow path 40 from leaking out of the turbine flow path 40.

Probe 470 may extend from bushing 464 and into turbine flow path 40. Probe 470 may be configured to measure the temperature of the turbine 400 within the turbine flow path 40. In the embodiment illustrated, probe 470 is configured to measure the temperature of the combusted air/fuel mixture in the third stage 403 and extends, at least partially, through the outer shroud 452 adjacent an airfoil 454 of a turbine nozzle segment 451 in the third stage 403. As illustrated probe 470 is proximal the upstream end 458 of turbine nozzle segment 451.

While the sensor assembly 461 is shown extending into the turbine 400 to measure the temperature within the turbine flow path 40, the sensor assembly 461 may extend into other locations of the gas turbine engine 100, such as the compressor 200 with the probe 470 extending at least partially through a shroud of the stator 250 and into the compressor flow path defined by the stator 250.

Figure 3:
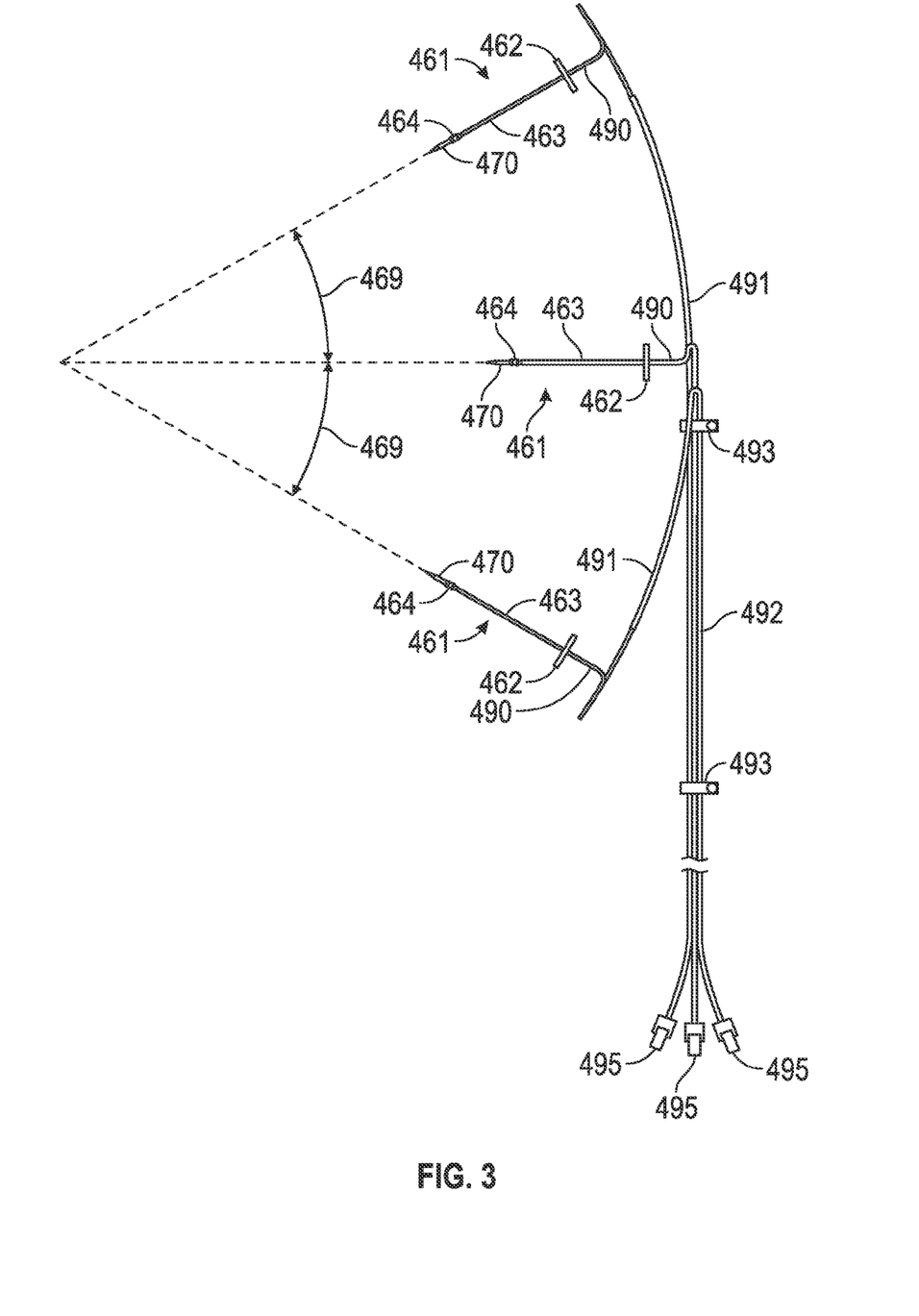
FIG. 3 is a plan view of the thermocouple sensor assembly of FIGS. 1 and 2.

FIG. 3 is a plan view of the thermocouple sensor assembly 460 of FIGS. 1 and 2. In the embodiment illustrated in FIG. 3, thermocouple sensor assembly 460 includes three sensor assemblies 461. Depending on the number of sensor assemblies 461 used for a particular gas turbine engine 100, the sensor assemblies 461 may be circumferentially spaced apart by a predetermined angle 469. In the embodiment illustrated, the predetermined angle 469 is approximately thirty degrees.

A sensor wire 490 may extend from each sensor assembly 461 extending through flange 462 and from flange 462. Sensor wire 490 may also extend into the sensor assembly 461 and into probe 470. Sensor wire 490 may include a circumferential portion 491 that is configured to extend circumferentially about the gas turbine engine 100. The circumferential portion 491 may extend within tubing 463. Portions of the sensor wires 490 of the sensor assemblies 461 for the thermocouple sensor assembly 460 may be brought together into a group, such as by clamping, and may be held together by one or more clamps 493. The grouped wires 492 may extend from the circumferential portion 491 away from the gas turbine engine 100 and to a connection point. Each sensor wire 490 may include a connection end 495. Connection ends 495 may be connected to a computer, controller, or other device configured to receive the signals from each sensor assembly 461. The one or more clamps 493 may clamp portions of a first sensor wire 490 between a first flange 462 and a first connection end 495 to portions of a second sensor wire 490 between a second flange 462 and a second connection end 495.

Figure 4:
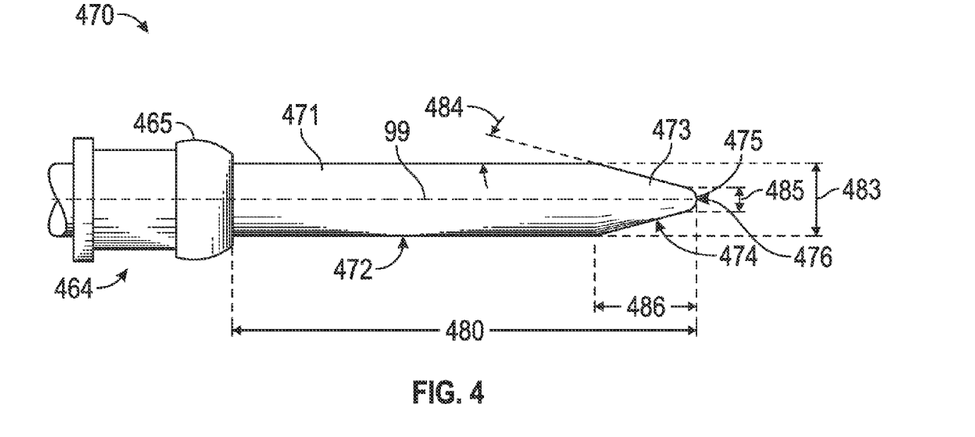
FIG. 4 is a plan view of a probe and bushing of a sensor assembly for the thermocouple sensor assembly of FIG. 3.

FIG. 4 is a plan view of a probe 470 and bushing 464 of a sensor assembly 461 for the thermocouple sensor assembly 460 of FIG. 3. Bushing 464 may include a sealing end 465 located at an end of bushing 464, such as adjacent probe 470. The sealing end 465 may be configured to form a seal with a stationary component of the gas turbine engine 100, such as the outer shroud 452 of a turbine nozzle segment 451. Sealing end 465 may include a spherical shape, such as a spherical segment shape. The spherical segment shape may be a hollow spherical segment. Sealing end 465 may be located at least partially within outer shroud 452 and probe hole 457.

Probe 470 may extend from bushing 464, such as from sealing end 465. Probe 470 and bushing 464 may extend along a common axis 99. Probe 470 may include a body 471, an anti-vortex tip 473, and a tip end 475. Body 471 may be a cylindrical shape, such as a hollow cylinder. Body 471 may extend from bushing 464. Anti-vortex tip 473 may be a conical shape. Tip end 475 may be a rounded end of anti-vortex tip 473 opposite body 471. Tip end 475 may extend from anti-vortex tip 473 distal to body 471 and may be a spherical shape, such as a spherical cap. The spherical cap may be a hollow spherical cap.

Probe 470 includes a probe length 480. The probe length 480 extends from bushing 464 to tip end 475 and includes the lengths of body 471, anti-vortex tip 473, and tip end 475. Probe length 480 may be determined by where in a given gas turbine engine 100 the probe 470 will be located, such as by the size of the turbine nozzle segment 451 that probe 470 will be located within. Probe length 480 may be configured to centrally locate tip end 475 between outer shroud 452 and inner shroud 453. In one embodiment, probe length 480 is from 12.7 millimeters (0.5 inches) to 76.2 millimeters (3.0 inches). In another embodiment, probe length 480 is from 27.94 millimeters (1.10 inches) to 33.02 millimeters (1.30 inches).

Probe 470 may also include a first diameter 483 and a second diameter 485. First diameter 483 may be the diameter of body 471 and may be the larger diameter of the conical shape of anti-vortex tip 473. Second diameter 485 may be the smaller diameter of the conical shape of anti-vortex tip 473, smaller than the first diameter 483. The second diameter 485 may also be/match the base diameter of the spherical cap shape of the tip end 475. In embodiments, first diameter 483 is from 4.648 millimeters (0.183 inches) to 4.903 millimeters (0.193 inches), and second diameter 485 is from 1.473 millimeters (0.058 inches) to 1.728 millimeters (0.068 inches). In other embodiments, first diameter 483 is 4.775 millimeters (0.188 inches), and second diameter 485 is 1.600 millimeters (0.063 inches).

Probe 470 may also include a probe tip length 486. Probe tip length 486 may be from 0.345 inches to 0.355 inches. In embodiments, the ratio of first diameter 483 over the probe tip length is from 0.49 to 0.58. In other embodiments, the ratio of first diameter 483 over probe tip length is from 0.53 to 0.54.

Body 471 may include a body surface 472. Body surface 472 may be a cylindrical surface, such as a right circular cylinder. Anti-vortex tip 473 may include an anti-vortex tip surface 474. Anti-vortex tip surface 474 may be a conical surface, such as a frusto-conical surface. Tip end 475 may include a tip end surface 476. The tip end surface 476 may be a spherical cap shape with a base diameter matching the second diameter 485. Anti-vortex tip surface 474 may be tangent to tip end surface 476.

Anti-vortex tip 473 may taper from first diameter 483 to second diameter 485 forming the conical shape. Anti-vortex tip 473 includes a taper angle 484. Taper angle 484 may be the angle of anti-vortex tip surface 474 relative to body surface 472. Taper angle 484 may also be the angle of anti-vortex tip surface 474 relative to axis 99. In embodiments, taper angle 484 is from ten degrees to twenty degrees. In other embodiments, taper angle 484 is from fourteen degrees to sixteen degrees. In yet other embodiments, taper angle 484 is fifteen degrees.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys. In embodiments, one or more components of the thermocouple sensor assembly 460 including the probe 470 and bushing 464 may be made from alloy 600.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIGS. 1 and 2, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500. Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 via injector 310 and combusted. The combusted fuel/air mixture is directed through turbine 400 along turbine flow path 40 where energy is extracted from the combustion reaction by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Unlike in other thermocouple applications, such as within ovens, the combusted fuel/air mixture within the turbine 400 traveling along turbine flow path 40 may be traveling at velocities up to 213 meters/second (700 feet/sec) or more, and may be 538 degrees Celsius (1000 degrees Fahrenheit) or more. The hot combusted fuel/air mixture may impinge on the probe of a thermocouple sensor assembly including the probe tip, such as an elongated cylindrical tip, which may induce vortices around the probe resulting in vibration and vibrational stresses within the probe. The temperature of the probe may also be increased resulting in thermal expansion and thermal stresses within the probe. The combined stresses may result in failure of the probe, such as the tip breaking off, and may result in a shorter lifecycle of the probe.

The shape of probe 470 including the shape of anti-vortex tip 473, anti-vortex tip surface 474, and tip end 475 may reduce or prevent the formation of vortices around probe 470. Reducing or preventing the formation of vortices around probe 470 may reduce the vibration of probe 470, reducing the combined stresses within probe 470. The shape of probe 470 including the shape of body 471, anti-vortex tip 473, and tip end 475 may reduce the formation of stress concentrations and may reduce the formation of thermal stresses within probe 470, which may further reduce the combined stresses within probe 470. The shape of probe 470 may result in a probe 470 with a longer lifecycle and reduced likelihood of failure of the probe 470 within the turbine 400 of gas turbine engine 100.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes particular thermocouple sensor assembly, it will be appreciated that the thermocouple sensor assembly in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A thermocouple sensor assembly for a gas turbine engine, the thermocouple sensor assembly comprising:
    a flange;
    tubing extending from the flange;
    a bushing adjacent the tubing, distal to the flange;
    a probe including
        a body extending from the bushing opposite the tubing, the body including a first cylindrical shape,
        an anti-vortex tip extending from the body from a first diameter to a second diameter smaller than the first diameter at a taper angle from ten degrees to twenty degrees, the anti-vortex tip including a first conical shape, and
        a tip end extending from the anti-vortex tip distal to the body, the tip end being a first spherical cap shape with a base diameter matching the second diameter;
    a sensor wire extending through the flange and extending from the flange opposite the tubing; and
    a connection end coupled to the sensor wire distal to the flange; and
    wherein the first diameter is from 4.648 millimeters to 4.903 millimeters and the second diameter is from 1.473 millimeters to 1.728 millimeters.

2. The thermocouple sensor assembly of claim 1, wherein the taper angle is from fourteen degrees to sixteen degrees.

3. The thermocouple sensor assembly of claim 2, wherein the probe includes a probe length extending from the bushing to the tip end, the probe length being from 27.94 millimeters to 33.02 millimeters.

4. The thermocouple sensor assembly of claim 1, wherein the taper angle is fifteen degrees.

5. The thermocouple sensor assembly of claim 1, further comprising:
    a second flange;
    second tubing extending from the second flange;
    a second bushing adjacent the second tubing, distal to the second flange;
    a second probe including
        a second body extending from the second bushing, the second body including a second cylindrical shape equivalent to the first cylindrical shape,
        a second anti-vortex tip extending from the second body from a third diameter equivalent to the first diameter to a fourth diameter equivalent to the second diameter at the taper angle, the second anti-vortex tip including a second conical shape equivalent to the first conical shape, and
        a second tip end extending from the second anti-vortex tip distal to the second body, the second tip end being a second spherical cap shape equivalent to the first spherical cap shape;
    a second sensor wire extending through the second flange and from the second flange opposite the second tubing;
    a second connection end coupled to the second sensor wire distal to the second flange; and
    one or more clamps clamping portions of the sensor wire between the flange and the connection end to portions of the second sensor wire between the second flange and the second connection end.

6. The thermocouple sensor assembly of claim 1, wherein the anti-vortex tip includes a tip length, and wherein the ratio of the first diameter over the tip length is from 0.49 to 0.58.

7. A gas turbine engine including the thermocouple sensor assembly of claim 1.

8. The sensor assembly of claim 1, wherein the first diameter is from 4.648 millimeters to 4.903 millimeters and the second diameter is from 1.473 millimeters to 1.728 millimeters.

9. The sensor assembly of claim 1, wherein the sealing end includes a spherical segment shape.

10. The sensor assembly of claim 1, wherein the probe includes a probe length from 27.94 millimeters to 33.02 millimeters, the probe length including lengths of the body, the anti-vortex tip, and the tip end.

11. The sensor assembly of claim 1, wherein the tip end includes a tip end surface, the tip end surface including a spherical cap shape with a base diameter matching the second diameter, and wherein the anti-vortex tip surface is tangent to the tip end surface.

12. A gas turbine engine including the sensor assembly of claim 1.

13. A sensor assembly for a gas turbine engine, the sensor assembly comprising:
    a flange;
    a bushing spaced apart from the flange, the bushing including a sealing end;
    tubing located between the flange and the bushing; and
    a probe including
        a body extending from the sealing end, the body including a body surface, the body surface being a right circular cylinder with a first diameter,
        an anti-vortex tip extending from the body, the anti-vortex tip including a tip length and an anti-vortex tip surface, the anti-vortex tip surface being a conical surface extending from the body surface to a smaller second diameter at a taper angle from fourteen degrees to sixteen degrees, wherein the ratio of the first diameter over the tip length is from 0.49 to 0.58, and a tip end extending from the anti-vortex tip distal to the body, the tip end including a spherical shape.

14. The sensor assembly of claim 13, wherein the taper angle is fifteen degrees.

15. A turbine of a gas turbine engine, the turbine comprising:

an outer housing;

a stage located within the outer housing, the stage including a turbine disk assembly, and a turbine nozzle including a turbine nozzle segment, the turbine nozzle segment including an outer shroud, an inner shroud located within the outer shroud, an airfoil extending between the outer shroud and the inner shroud, and a probe hole extending through the outer shroud;

a sensor assembly including a flange coupled to the outer housing, tubing extending from the flange through the outer housing toward the turbine nozzle segment, a bushing located at least partially within the outer shroud, the bushing including a sealing end that forms a seal with the outer shroud, and a probe extending at least partially through the probe hole and between the outer shroud and the inner shroud, the probe including a body extending from the bushing, the body including a cylindrical shape, an anti-vortex tip extending from the body at a taper angle from fourteen to sixteen degrees and located between the outer shroud and the inner shroud, the anti-vortex tip including a conical shape with a first diameter adjacent the body and a second diameter distal to the body, wherein the first diameter is from 4.648 millimeters to 4.903 millimeters and the second diameter is from 1.473 millimeters to 1.728 millimeters and a tip end extending from the anti-vortex tip distal to the body, the tip end including a spherical shape.

16. The turbine of claim 15, wherein the stage is a third stage of the turbine.

17. The turbine of claim 15, wherein the probe includes a probe length extending from the bushing to the tip end, the probe length being configured to centrally locate the tip end between the outer shroud and the inner shroud.

18. The turbine of claim 17, wherein the sealing end includes a spherical shape located at least partially within the outer shroud.

* * * * *